US012725050B2

(12) United States Patent
Lee

(10) Patent No.: US 12,725,050 B2
(45) Date of Patent: Sep. 1, 2026

(54) KNOWLEDGE-BASED DIALOGUE SYSTEM FOR SELF-LEARNING DIALOGUES AND LEARNING METHOD THEREOF

(71) Applicant: ELECTRONICS AND TELECOMMUNICATIONS RESEARCH INSTITUTE, Daejeon (KR)

(72) Inventor: Yo Han Lee, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 943 days.

(21) Appl. No.: 17/964,477

(22) Filed: Oct. 12, 2022

(65) Prior Publication Data

US 2023/0134933 A1 May 4, 2023

(30) Foreign Application Priority Data

Nov. 3, 2021 (KR) ........................ 10-2021-0149917
Jun. 20, 2022 (KR) ........................ 10-2022-0074701

(51) Int. Cl.
*G06N 5/02* (2023.01)
*G06F 16/3329* (2025.01)
*G06N 5/04* (2023.01)

(52) U.S. Cl.
CPC ........... *G06N 5/02* (2013.01); *G06F 16/3329* (2019.01); *G06N 5/04* (2013.01)

(58) Field of Classification Search
CPC ............ G06N 5/02; G06N 5/04; G06N 3/006; G06N 3/08; G06N 5/041; G06N 20/00;
(Continued)

(56) References Cited

U.S. PATENT DOCUMENTS 10,650,814 B2 5/2020 Wang et al.
11,144,833 B2 10/2021 Kwon et al.
(Continued)

FOREIGN PATENT DOCUMENTS

KR 20190034490 A 4/2019
KR 10-2020-0014047 A 2/2020
KR 10-2252459 B1 5/2021

OTHER PUBLICATIONS

Chen, W. et al., "Open Question Answering Over Tables and Text", arXiv:2010.10439v2 [cs.CL], Feb. 10, 2021.
(Continued)

*Primary Examiner* — Mohammad Ali
(74) *Attorney, Agent, or Firm* — Rabin & Berdo, P.C.

(57) ABSTRACT

Disclosed is a self-learning method of a knowledge-based dialogue system. The method includes generating, by the query generating module, a natural language query by itself based on a knowledge path for a query selected from a knowledge graph, inferring, by the answer generating module, a knowledge path for an answer corresponding to a query intention of the natural language query from the knowledge graph, and generating a natural language answer by itself based on the knowledge path for an answer, comparing and evaluating, by the dialogue evaluating unit, the knowledge path for a query and the knowledge path for an answer, and learning, by the query generating module and the answer generating module, a dialogue between the query generating module and the answer generating module based on an evaluation result of the dialogue evaluating unit.

16 Claims, 8 Drawing Sheets

(58) Field of Classification Search
CPC ... G06N 5/022; G06F 16/3329; G06F 40/279; G06F 16/9024; G06F 40/35; G06F 16/90332
See application file for complete search history.

(56) References Cited

U.S. PATENT DOCUMENTS

| | | | | |
|---|---|---|---|---|
| 11,442,992 | B1 * | 9/2022 | Moon | G06N 20/00 |
| 11,847,424 | B1 * | 12/2023 | Harkous | G06N 20/00 |
| 2022/0207067 | A1 * | 6/2022 | Lee | G06F 16/35 |
| 2022/0335219 | A1 * | 10/2022 | Sengupta | G06N 3/042 |
| 2022/0351716 | A1 * | 11/2022 | Kim | G10L 25/30 |
| 2023/0009983 | A1 * | 1/2023 | Subramanian | G06F 16/686 |
| 2023/0100883 | A1 * | 3/2023 | Luus | G06F 16/2455 706/16 |

OTHER PUBLICATIONS

Liu, B. et al., "Iterative Policy Learning in End-To-End Trainable Task-Oriented Neural Dialog Models", arXiv:1709.06136v1 [cs.CL], Sep. 18, 2017.
Shah, P. et al., "Building a Conversational Agent Overnight with Dialogue Self-Play", arXiv:1801.04871v1 [cs.AI], Jan. 15, 2018.

* cited by examiner

Figure 4:
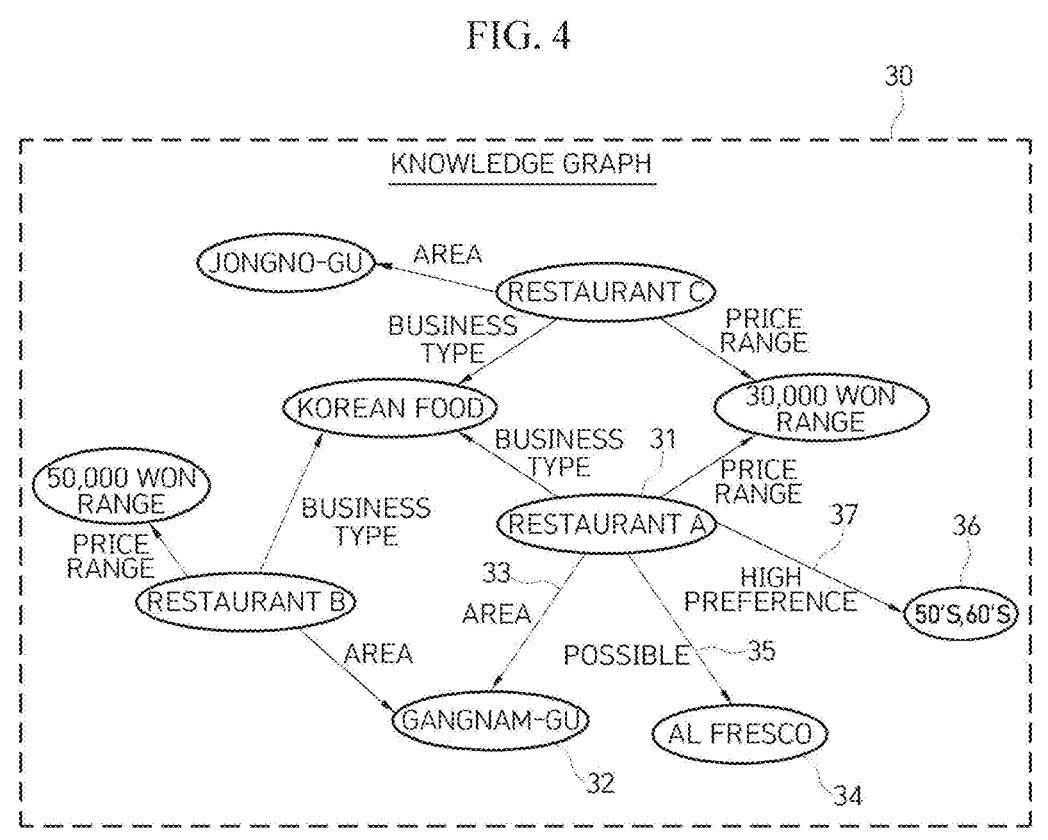

KNOWLEDGE GRAPH

JONGNO-GU
AREA
RESTAURANT C
BUSINESS TYPE
PRICE RANGE
KOREAN FOOD
30,000 WON RANGE
BUSINESS TYPE
31
50,000 WON RANGE
BUSINESS TYPE
PRICE RANGE
RESTAURANT A
37
36
PRICE RANGE
33
HIGH PREFERENCE
RESTAURANT B
AREA
50'S,60'S
AREA
POSSIBLE
35
GANGNAM-GU
AL FRESCO
32
34

10
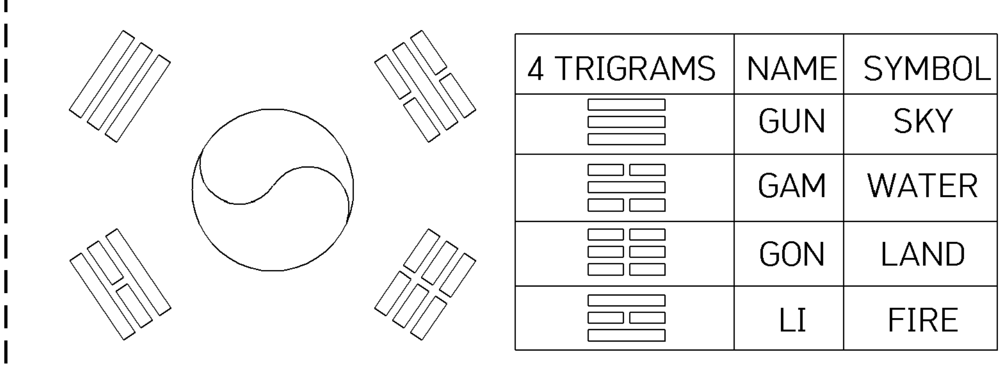
| 4 TRIGRAMS | NAME | SYMBOL |
|---|---|---|
| | GUN | SKY |
| | GAM | WATER |
| | GON | LAND |
| | LI | FIRE |
IMAGE TABLE
THE NATIONAL FLAG OF THE REPUBLIC OF KOREA IS CALLED TAEGEUKGI, AND THE TAEGEUKGI INCLUDES A TAEGEUK PATTERN IN THE CENTER AND 4 TRIGRAMS AT THE CORNERS ON A WHITE BACKGROUND. THE WHITE BACKGROUND SYMBOLIZES PEACE AND THE TAEGEUK PATTERN SYMBOLIZES HARMONY.
TEXT
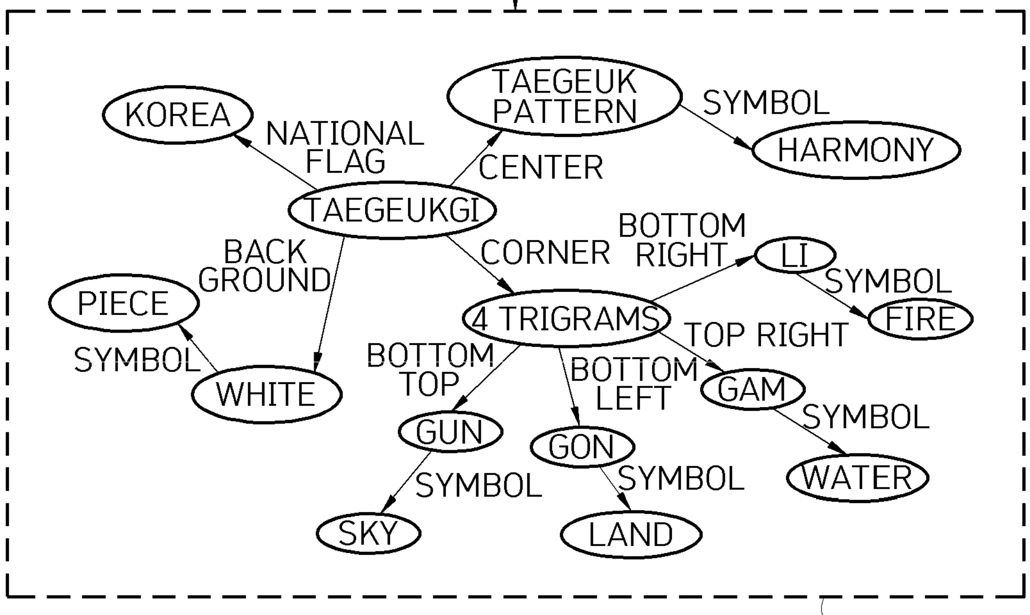
30

KNOWLEDGE-BASED DIALOGUE SYSTEM FOR SELF-LEARNING DIALOGUES AND LEARNING METHOD THEREOF

CROSS-REFERENCE TO RELATED APPLICATIONS

This application claims the benefit of the Korean Patent Application Nos. 10-2021-0149917 filed on Nov. 3, 2021, and 10-2022-0074701 filed on Jun. 20, 2022, which are hereby incorporated by reference as if fully set forth herein.

BACKGROUND

Field of the Invention

The present invention relates to a knowledge-based dialogue system and a learning method thereof, and more particularly, to a knowledge-based dialogue system for learning a dialogue by generating a query on its own and answering thereto, and a learning method thereof.

Discussion of the Related Art

The knowledge-based dialogue system is a system that performs free dialogue or query-and-answer dialogue based on given knowledge, and although performance of knowledge-based dialogue systems has been rapidly improved due to the development of machine learning and deep learning technology, they still have many problems.

First, since general dialogue systems learn dialogues based on general types of knowledge, they cannot generate detailed and specific dialogues based on specialized and specific types of knowledge. In a real dialogue environment, the dialogue system should be able to generate dialogue by understanding various types of knowledge in an integrated way. Secondly, in order for the dialogue system to learn dialogue based on various types of knowledge, it is necessary to build learning data including various types of large-capacity knowledge, but a lot of time and high costs are required to construct such learning data.

SUMMARY

An aspect of the present invention is directed to providing a knowledge-based dialogue system which learns dialogues by generating and answering queries on its own based on various types of knowledge, including unstructured knowledge and structured knowledge, while minimizing dependence on learning data including a large amount of knowledge, and a learning method thereof.

To achieve these and other advantages and in accordance with the purpose of the invention, as embodied and broadly described herein, there is provided a self-learning method of a knowledge-based dialogue system, as a learning method of a dialogue system including a query generating module, an answer generating module, and a dialogue evaluating unit executed by a processor, the self-learning method including: generating, by the query generating module, a natural language query by itself based on a knowledge path for a query selected from a knowledge graph; inferring, by the answer generating module, a knowledge path for an answer corresponding to a query intention of the natural language query from the knowledge graph, and generating a natural language answer by itself based on the knowledge path for an answer; comparing and evaluating, by the dialogue evaluating unit, the knowledge path for a query and the knowledge path for an answer; and learning, by the query generating module and the answer generating module, a dialogue between the query generating module and the answer generating module based on an evaluation result of the dialogue evaluating unit.

The self-learning method may further include: expressing, by a knowledge expressing unit executed by the processor, complex knowledge including unstructured knowledge and structured knowledge as the knowledge graph including a set of triples describing a relationship between entities.

The generating of the natural language query by itself may include: selecting a knowledge path for a query connecting an entity used in a current dialogue turn and a correct answer entity to be used in a next dialogue turn in the knowledge graph; and generating the natural language query corresponding to the knowledge path for a query by using a machine learning model trained to generate the natural language query based on a knowledge graph for learning extracted from a dialogue corpus.

The generating of the natural language answer by itself may include: analyzing the query intention by analyzing a relationship between entities included in the natural language query; inferring the knowledge path for an answer describing a relationship between at least one entity among the entities in the knowledge graph and a correct answer entity corresponding to the query intention; and generating a natural language answer based on the correct answer entity and the knowledge path for an answer.

The generating of the natural language query by itself may include: selecting a correct answer entity to be used in a next dialogue turn based on a partial knowledge graph used in a current dialogue turn, the partial knowledge graph representing a part of the knowledge graph; selecting the knowledge path for a query describing a relationship between an entity included in the partial knowledge graph and the correct answer entity; and generating the natural language query based on the knowledge path for a query.

The selecting of the correct answer entity may include: selecting a plurality of candidate correct answer entities connected to the entity included in the partial knowledge graph within the knowledge graph; and selecting, as the correct answer entity, a candidate correct answer entity having a lowest number of use in the current dialogue turn from among the plurality of candidate correct answer entities.

The knowledge path for a query may describe a first relationship between a first entity used in the current dialogue turn and a first correct answer entity connected to the first entity in the knowledge graph, and the knowledge path for an answer may describe a second relationship between a second entity included in the natural language query and a second correct answer entity corresponding to the query intention of the natural language.

The evaluating may include comparing the first correct answer entity with the second correct answer entity; and comparing the first relationship with the second relationship.

In another aspect of the present invention, there is provided a knowledge-based dialogue system for self-learning conversations, including: a communication interface configured to receive complex knowledge including unstructured knowledge and structured knowledge; a knowledge conversion unit configured to convert the complex knowledge into a knowledge graph including a set of knowledge triples describing relationships between entities; a query generating module configured to generate a natural language query by itself based on a knowledge path for a query selected from the knowledge graph; an answer generating module configured to infer a knowledge path for an answer corresponding to a query intention of the natural language query from the knowledge graph, and generating a natural language answer by itself based on the knowledge path for an answer; a dialogue evaluating unit configured to compare the knowledge path for a query and the knowledge path for an answer to evaluate a difference between the knowledge path for a query and the knowledge path for an answer; and a processor configured to control operations of the knowledge conversion unit, the query generating module, the answer generating module, and the dialogue evaluating unit.

The query generating module may include: a correct answer selecting unit configured to select a correct answer entity to be used in a next dialogue turn based on a partial knowledge graph used in a current dialogue turn, the partial knowledge graph representing a part of the knowledge graph; a path selecting unit configured to select the knowledge path for a query describing a relationship between an entity included in the partial knowledge graph and the correct answer entity; and a natural language query generating unit configured to generate the natural language query based on the knowledge path for a query.

The correct answer selecting unit may select a plurality of candidate correct answer entities connected to the entity included in the partial knowledge graph in the knowledge graph and then selects a candidate correct answer entity having a least number of use in the current dialogue turn, among the plurality of candidate correct answer entities, as the correct answer entity.

The answer generating module may include: a query understanding unit configured to analyze a relationship between the entities included in the natural language query and analyze the query intention; a correct answer interfering unit configured to infer the knowledge path for an answer describing a relationship between at least one of the entities in the knowledge graph and the correct answer entity corresponding to the query intention; and a natural language answer generating unit configured to generate a natural language answer based on the correct answer entity and the knowledge path for an answer.

The dialogue evaluating unit may compare the knowledge path for a query describing a first relationship between the entity used in the current dialogue turn and a first correct answer entity selected based on the entity used in the current dialogue turn with the knowledge path for an answer describing a second relationship between the entity included in the natural language query and a second correct answer entity inferred based on the entity included in the natural language query.

The dialogue evaluating unit may compare the first correct answer entity with the second correct answer entity and compares the first relationship with the second relationship.

In another aspect of the present invention, there is provided a self-learning method of a knowledge-based dialogue system, as a learning method of a dialogue system including a query generating module, an answer generating module, and a dialogue evaluating unit executed by a processor, the self-learning method including: selecting, by the query generating module, a knowledge path for a query describing a first relationship between a first entity used in a current dialogue turn and a first correct answer entity to be used in a next dialogue turn in a knowledge graph and generating a natural language query based on the knowledge path for a query; selecting, by the answer generating module, a knowledge path for an answer describing a second relationship between a second entity included in the natural language query and a second correct answer entity corresponding to a query intention of the natural language query in the knowledge graph and generating a natural language answer by itself based on the knowledge path for an answer; evaluating, by the dialogue evaluating unit, an error between the knowledge path for a query and the knowledge path for an answer; and learning, by the query generating module and the answer generating module, the knowledge path for a query and the knowledge path for an answer based on the error.

The knowledge graph may express a complex knowledge including unstructured knowledge and structured knowledge as a set of triples describing a relationship between entities.

The knowledge path for a query may be triple data structured in the order of the first entity, the first relationship, and the first correct answer entity, and the knowledge path for an answer may be triple data structured in the order of the second entity, the second relationship, and the second correct answer entity.

The measuring of an error may include: measuring an error between the first relationship and the second relationship; and measuring an error between the first correct answer entity and the second correct answer entity.

According to the present invention, learning is performed by modeling a knowledge graph describing a relationship between entities, regardless of the type of knowledge, selecting and querying a correct answer and a knowledge path for inducing the correct answer by itself from given knowledge, and inferring (predicting) the knowledge path and the correct answer again therefrom, so that a large amount of knowledge may be learned even with a small amount of data, and additional learning data is not required in a situation in which new knowledge is added or existing knowledge is changed, unlike the related art that requires a large amount of learning data to learn a vast amount of knowledge.

It is to be understood that both the foregoing general description and the following detailed description of the present invention are exemplary and explanatory and are intended to provide further explanation of the invention as claimed.

BRIEF DESCRIPTION OF THE DRAWINGS

FIG. 4 is a diagram schematically illustrating a knowledge graph according to an embodiment of the present invention.

FIG. 7 is a diagram illustrating an example of complex knowledge that may be used when the present invention is applied to a teacher system.

DETAILED DESCRIPTION OF THE INVENTION

Figure 1:
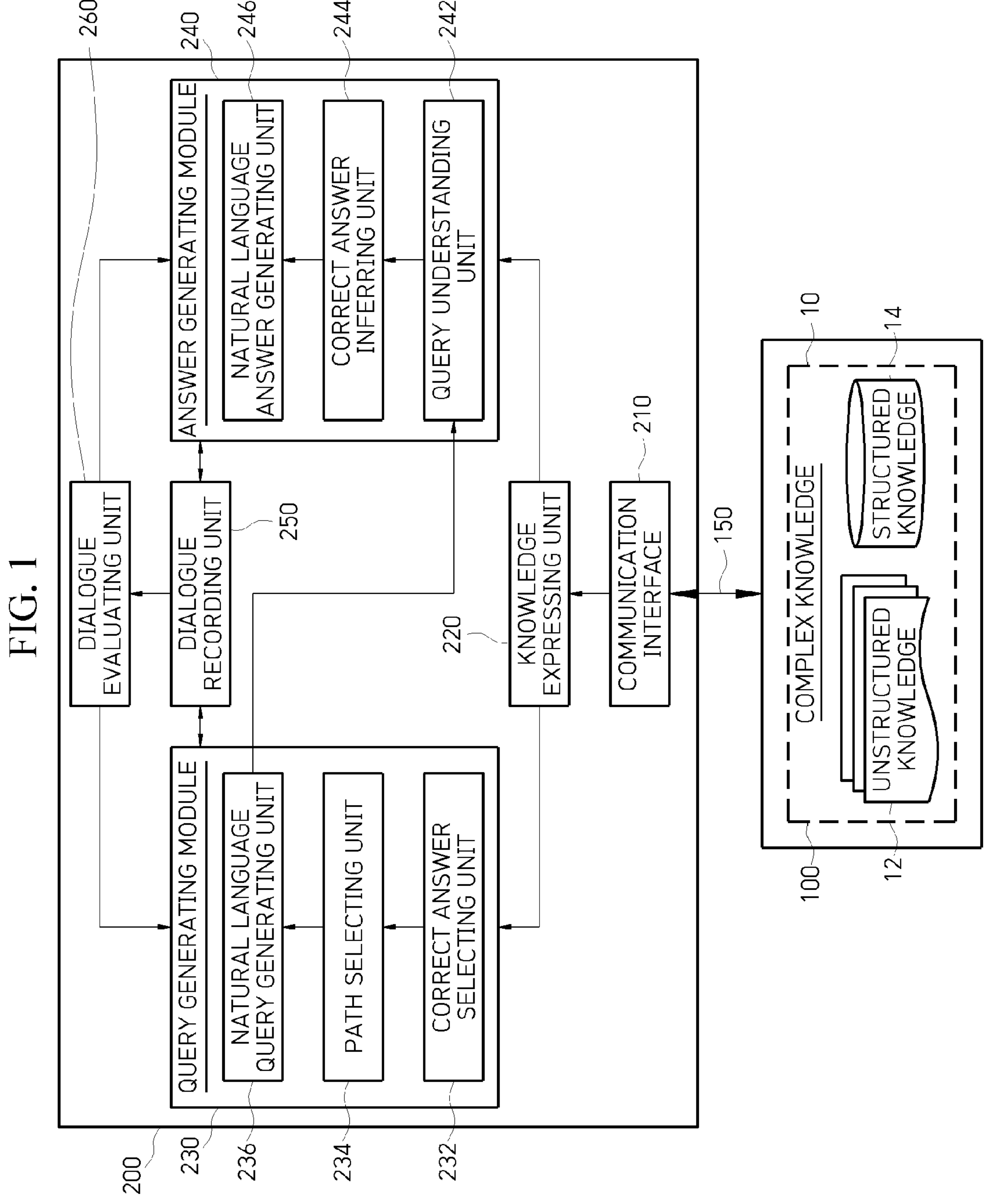
FIG. 1 is a block diagram illustrating a schematic internal configuration of a knowledge-based dialogue system according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

In the following description, the technical terms are used only for explain a specific exemplary embodiment while not limiting the present invention. The terms of a singular form may include plural forms unless referred to the contrary. The meaning of 'comprise', 'include', or 'have' specifies a property, a region, a fixed number, a step, a process, an element and/or a component but does not exclude other properties, regions, fixed numbers, steps, processes, elements and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the drawings and descriptions below, each of the components indicated or described as one block may be an independent hardware block that exchanges information or data in the form of a digital signal in a wired or wireless communication method, or may be a software block executed in at least one processor. The hardware block may be implemented by at least one CPU, at least one GPU, or a combination thereof.

FIG. 1 is a block diagram illustrating a schematic internal configuration of a knowledge-based dialogue system according to an embodiment of the present invention.

Referring to FIG. 1, a knowledge-based dialogue system 200 according to an embodiment of the present invention may include a knowledge expressing unit (or knowledge converting unit) 220 expressing (or converting) complex knowledge 10 including structured knowledge and unstructured knowledge provided from a storage medium 100 as (or into) a knowledge graph, a query generating module 230 generating a query utterance (or query) based on the knowledge graph, an answer generating module 240 generating an answer utterance (answer) with respect to the query utterance, a dialogue recording unit 250 recording the query utterance and the answer utterance generated by the two modules 230 and 240 and a partial knowledge graph used in a natural language dialogue process including the query utterance and the answer utterance, and a dialogue evaluating unit 260 evaluating the modules 230 and 240 based on the natural language dialogue and partial knowledge graph recorded by the dialogue recording unit 250.

The knowledge-based dialogue system 200 may be implemented as a portable terminal, such as a smartphone or tablet, a PC, or a server.

In addition, the knowledge-based dialogue system 200 according to an embodiment of the present invention may further include a communication interface 210 receiving the complex knowledge 10 including the unstructured knowledge 12 and the structured knowledge 14 stored in the storage medium 100 through a network 150. In this case, the storage medium 100 may be a component included in a portable terminal, a PC, or a server (e.g., a web server) connected to the network 150.

The network 150 may include may include any network that may exchange data through wired/wireless a wired Internet service, a local area network (LAN), a wide area network (WAN), an intranet, a wireless Internet service, a mobile computing service, a wireless data communication service, a wireless Internet access service, a satellite communication service, a wireless LAN, Bluetooth, etc. When the network 150 is connected to a smartphone or tablet, the network 150 may be a wireless data communication service, such as 3G, 4G, or 5G, or a wireless LAN, such as Wi-Fi, or Bluetooth.

Hereinafter, each of the components included in the knowledge-based dialogue system illustrated in FIG. 1 will be described in more detail.

Knowledge Expressing Unit 220

The knowledge expressing unit 220 expresses (converts) the complex knowledge 10 including unstructured knowledge (unstructured data) and structured knowledge (structured data) as (into) a knowledge graph.

The unstructured knowledge refers to a data model not having a wide variety of data formats or a specific schema, and the structured knowledge refers to a data model having a predefined data format or a specific schema.

For example, unstructured knowledge may include document data in a text form (hereinafter referred to as 'text', 'sentence' or 'document'), image data (hereinafter referred to as an 'image'), video data (hereinafter referred to as 'video'), and the like, and the structured knowledge may be a database (DB), tabular data (hereinafter referred to as a 'table'), and the like.

The knowledge graph refers to a set of triple data (hereinafter, referred to as 'triple' or 'knowledge triple') describing a relationship between an entity and another entity. For example, when an entity is 'A', another entity is 'B', and a relationship between 'A' and 'B' is R, the triple refers to [A, R, B] or information structured in an order of A-R-B. As another example, when one entity is a subject, another entity is an object, and a relationship between the subject and the object is a predicate, the triple refers to a data model of [subject, predicate object] or structured in an order of subject-predicate-object.

One triple existing in the knowledge graph may be referred to as a first-order relation triple. A plurality of triples having continuity in the knowledge graph may be referred to as a multi-order relation triple.

A first-order relation triple may be expanded into a multi-order relation triple. For example, a first-order relation triple, such as [A, R, B], and another first-order relation triple, such as [B, R', C] may be defined as a second-order relation triple, such as [A, R, R', C]. In this manner, the first-order relation triple may be expanded into a multi-order relation triple.

In addition, the knowledge graph may refer to a semantic graph between entities to improve search results by accumulating semantic information from various sources. Here, the semantic information that refers to the relationship between entities is expressed as a certain type of information.

The knowledge graph may be built using, for example, resource description framework (RDF). RDF is a graph-type data model for describing properties, characteristics, relationships, etc. of all resources (web pages, images, videos, etc.) having a uniform resource identifier (URI). RDF expresses a relationship between two entities, a subject and an object, and a property or predicate describes the characteristics and features of this relationship.

In an embodiment of the present invention, as a method for expressing unconstructed knowledge in the form of a document as a triple, an entity name recognition algorithm, a relation extraction algorithm, or a learning (e.g., machine learning and/or deep learning, etc.)-based algorithm of extracting a knowledge graph from a document may be used.

In an embodiment of the present invention, as a method for expressing unstructured knowledge in the form of images and videos as a triple, an object detection algorithm, an object relation extraction algorithm, a learning-based algorithm for extracting a knowledge graph from an image and video may be utilized, or a method of expressing an image and a video as a text-type document using image and video captioning, etc. and then expressing the unstructured knowledge in the form of a text representing the image and video as a triple using the aforementioned entity name recognition algorithm, relation extraction algorithm, or learning-based algorithm of extracting a knowledge graph from a document may be utilized.

In an embodiment of the present invention, as a method for expressing tabular structured knowledge as a triple, an entity may be extracted through a keyword extraction algorithm or a specified entity (e.g., a cell value of a table) may be utilized, and a relationship between entities may be obtained from row or column names of the table. As a method for constructing the knowledge graph, a person may manually construct the knowledge graph, in addition to the method of automatically extracting the knowledge graph from the complex knowledge 10.

Figure 2:
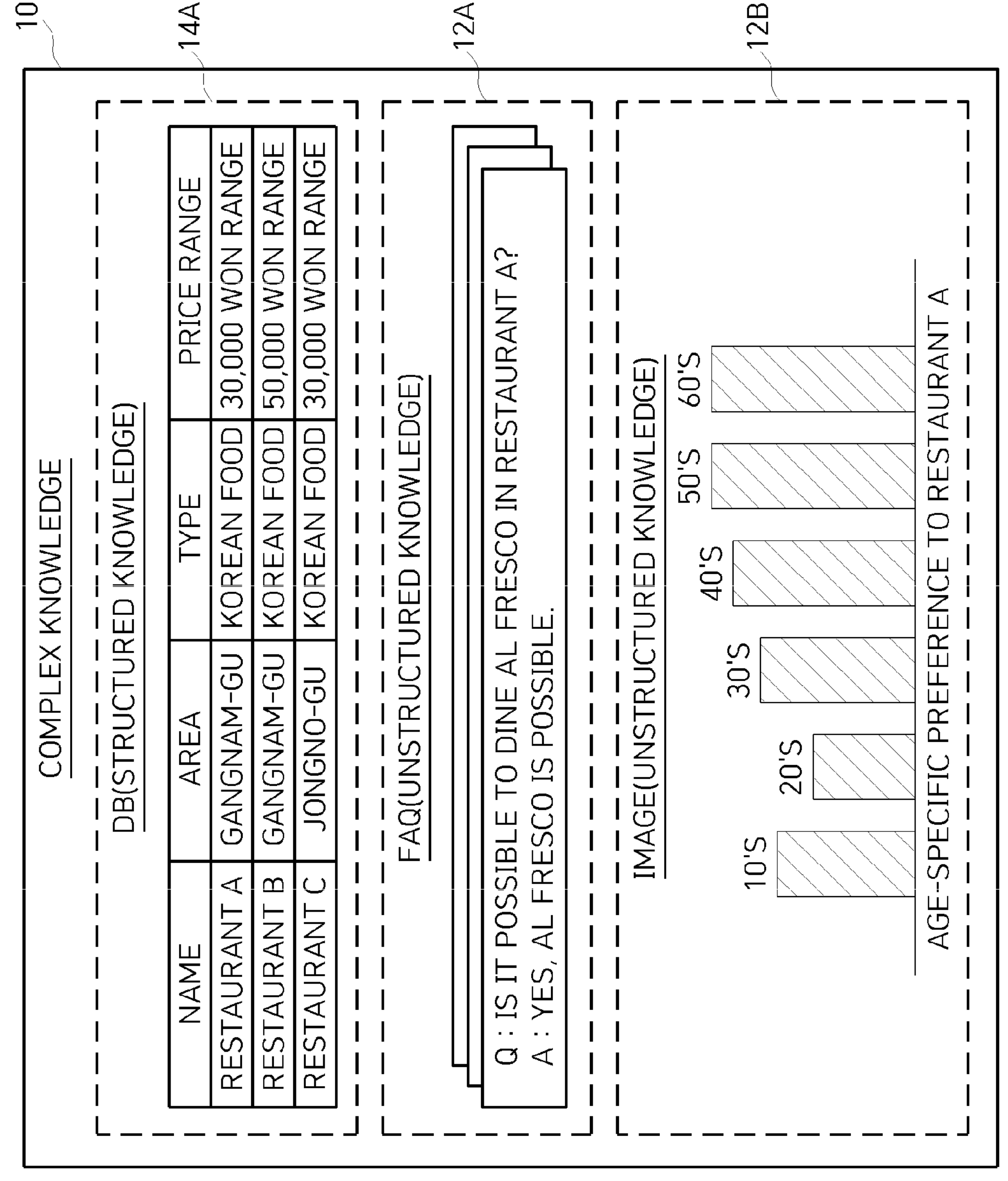
FIG. 2 is a diagram schematically illustrating complex knowledge according to an embodiment of the present invention.
Figure 3:
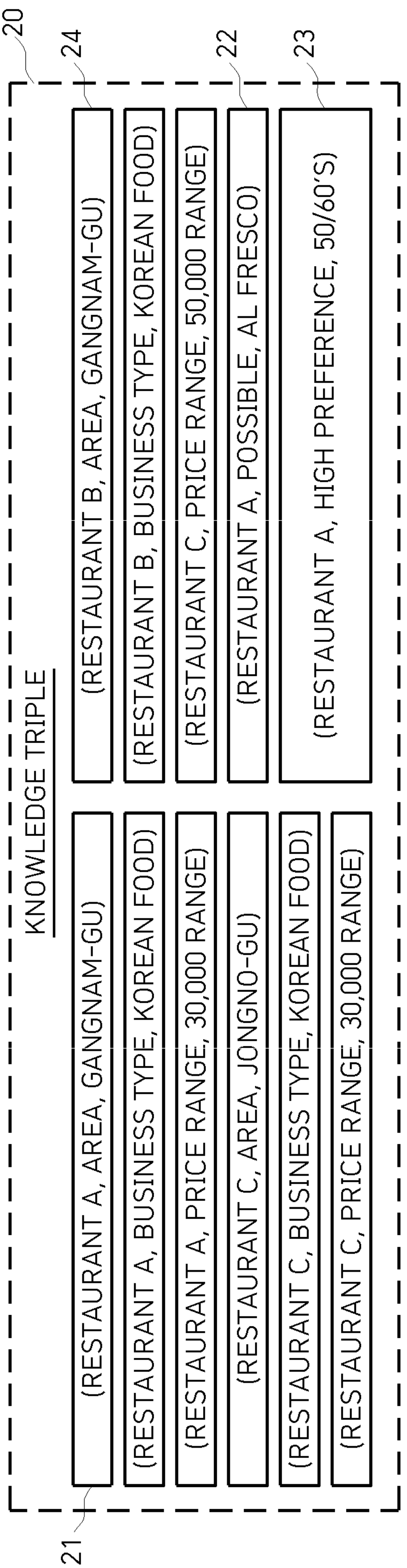
FIG. 3 is a diagram schematically illustrating a knowledge triple according to an embodiment of the present invention.

FIGS. 2 to 4 are diagrams for schematically illustrating complex knowledge, knowledge triples, and knowledge graphs according to an embodiment of the present invention.

Referring to FIGS. 2 to 4, a knowledge triple indicated by reference numeral 21 of FIG. 3 expresses a relationship between an entity of 'restaurant A' and an entity of 'Gangnam-gu' extracted from a table 14A representing the structured knowledge 14 illustrated in FIG. 2, by row name information (semantic information) of 'area' among the row names of the table 14A. As illustrated in FIG. 4, the knowledge triple 21 may express the entity 31 of 'restaurant A' and the entity 32 of 'Gangnam-gu' as a knowledge graph in the form of a connecting line 33 indicating a first-order relationship of 'area'. At this time, the line 33 indicating the relationship includes information indicating the directivity from 'restaurant A' toward 'Gangnam-gu'.

The knowledge triple indicated by reference numeral 22 of FIG. 3 expresses a relationship between an entity of 'restaurant A' and an entity of 'outdoor dining' extracted from a text 12A of the FAQ format representing an unstructured knowledge 12 illustrated in FIG. 2, as semantic information of 'possible'. This knowledge triple 22, as illustrated in FIG. 4, may express an entity 31 of 'restaurant A' and an entity 34 of 'outdoor dining' as a knowledge graph 30 in the form of a connecting line 35 indicating a first-order relationship of 'possible'.

The knowledge triple indicated by reference numeral 23 in FIG. 3 expresses a relationship between an entity of 'restaurant A' and an entity of '50*s*, 60*s*' extracted from the graph image 12B representing the unstructured knowledge 12 illustrated in FIG. 2, as semantic information of 'high preference'. As shown in FIG. 4, the knowledge triple 23 may express an entity 31 of 'restaurant A' and an entity 36 of '50*s*, 60*s*' as a knowledge graph in the form of a connecting line 37 indicating a first-order relationship of 'high preference'.

In addition, based on the knowledge graph 30 in which the entities 31, 32, 34, and 36 are connected in a first-order relationship, the entities 31, 32, 34, and 36 may be determined as a multi-order relationship. For example, a relationship between the entity 32 of 'Gangnam-gu' and the entity 36 of '50*s* and 60*s*' may be expanded to a secondary relationship formed by two lines 33 and 37 indicating 'local preference' and 'high preference' through the entity 31 of 'restaurant A'.

As such, the knowledge expressing unit 220 according to an embodiment of the present invention expresses the relationship between entities extracted from complex knowledge including different types of structured knowledge and unstructured knowledge as a knowledge graph as illustrated in FIG. 4.

Query Generating Module 230 and Answer Generating Module 240

Referring back to FIG. 1, the query generating module 230 and the answer generating module 240 are a machine learning model or a deep learning model executed by a processor, or a hardware module controlled by a processor, and perform a dialogue based on the knowledge graph expressed by (provided from) the knowledge expressing unit 220.

The query generating module 230 selects a correct answer entity for a natural language query to be uttered in a next dialogue turn based on a dialogue history and/or partial knowledge graph that has recorded a natural language dialogue process performed up to a current dialogue turn with the answer generating module 240.

In addition, the query generating module 230 selects a knowledge path to be expanded to the selected correct answer entity in the entire knowledge graph and then generates a natural language query to be uttered in the next dialogue turn. The partial knowledge graph refers to a part of the knowledge graph (30 in FIG. 4) used until the current dialogue turn.

The triples included in the knowledge graph (30 in FIG. 4) have a directivity in which they are listed in the order of query entity→relationship→correct answer entity. For example, in the case of a triple (24 in FIG. 3) configured with [restaurant B, business type, Korean food], a query may be "What is a business type of restaurant B?". As another example, in the case of a triple configured with [Korean food, business type, restaurant B], a query may be "Please tell me about a Korean restaurant." As another example, a first-order relation triple including [50*s*/60*s*, high preference, restaurant A] and another first-order relation triple including [restaurant A, business type, Korean food] consecutive to the first-order relation triple may be expanded to a secondary relation triple configured in the order of [50's, 60's, high preference, business type, Korean food], and in this case, a query may be "What type of restaurant do the elderly prefer?"

The query generating module 230 may include a correct answer selecting unit 232, a path selecting unit 234, and a natural language query generating unit 236.

The correct answer selecting unit 232 selects a correct answer entity based on a dialogue history in which a natural language dialogue process performed up to the current dialogue turn has been recorded and/or a partial knowledge graph used up to the current dialogue turn.

In the case of a system in which the user interacts with the system to obtain information, a correct answer to the user's query may not exist in the knowledge graph. A target that may be selected as a correct answer to model this situation includes 'no correct answer' as well as entities in the knowledge graph.

In the case of a first dialogue turn without a dialogue history, an arbitrary correct answer may be selected, and as the dialogue progresses, a correct answer entity having an expandable multi-order relationship may be selected from the partial knowledge graph. For example, on the assumption of the triple [restaurant B, business type, Korean food] of the partial knowledge graph 40 illustrated in FIG. 5 used in the dialogue process performed by the query generating module 230 and the answer generating module 240 up to the current dialogue turn, candidate correct answer entities may be 50,000 won range (41), restaurant A (31), restaurant C (42), and Gangnam-gu (32) when only the first-order relationship is considered.

As a method of selecting one correct answer entity from among the candidate correct answer entities 41, 31, 42, and 32, for diversity of dialogue, a dialogue history recording the dialogue process up to the current dialogue turn is checked, the number of times of use of each of the candidate correct answer entities is counted, and then, a candidate correct answer entity having the fewest number of times of use may be selected as a correct answer entity.

In order to select a candidate correct answer entity having the fewest number of times of use from the dialogue history, a statistics-based algorithm or a machine learning model trained in advance based on a dialogue corpus may be used. Alternatively, when a changed or newly added entity exists in the knowledge graph, the changed or newly added entity may be selected as a correct answer entity.

In order to expand the triple configured with [restaurant B, business type, Korean food] into a multi-order relation triple including a correct answer entity selected by the correct answer selecting unit 232 in the partial knowledge graph (40 of FIG. 5), the path selecting unit 234 selects an entity included in the partial knowledge graph (40 of FIG. 5) and a knowledge path describing a relationship of the correct answer entity.

Figure 5:
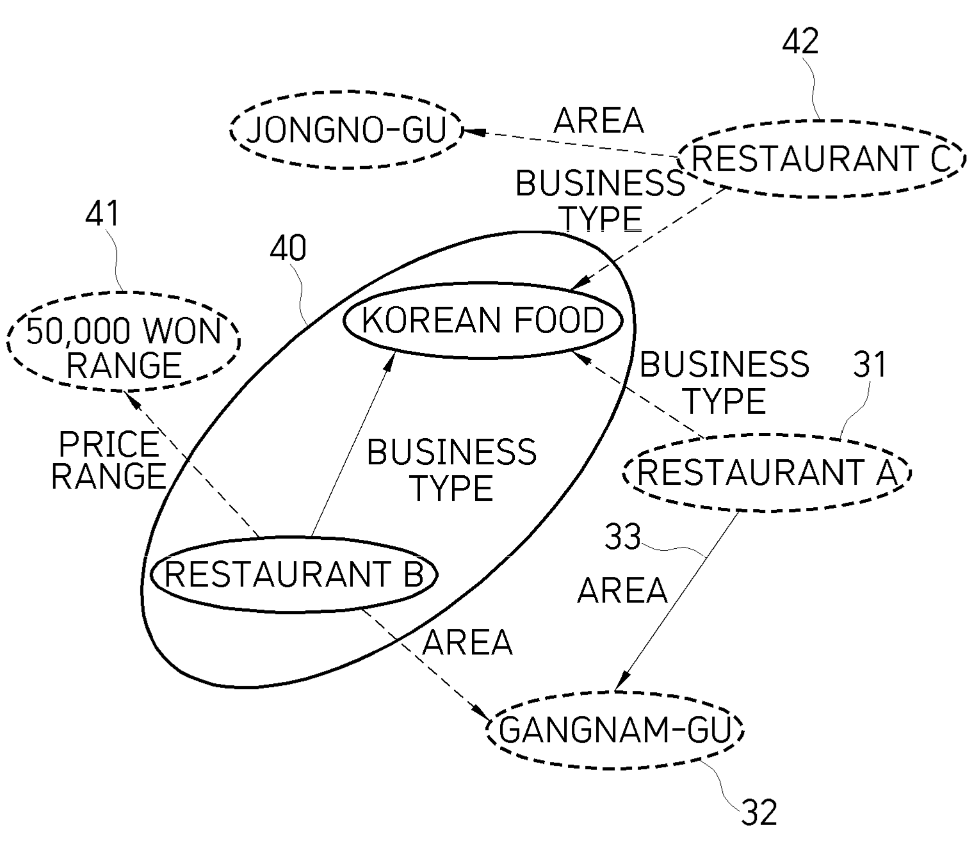
FIG. 5 is a diagram illustrating a partial knowledge graph used to select a correct answer entity according to an embodiment of the present invention.

For example, when "restaurant A" is selected as the correct answer entity 31 in FIG. 5, a first-order relation triple configured with [Korean food, business type, restaurant A] may be selected or a second-order relation triple configured with [(restaurant B, area, Gangnam-gu), (Gangnam-gu, area, restaurant A)] may be selected. Alternatively, both of the above two triples may be selected.

As a method of selecting a knowledge path to expand to a multi-order relation triple, a machine learning model previously trained to select a first-order relation triple with low inference difficulty at the beginning of learning and selecting a multi-order relation triple with high inference difficulty, such as a second-order, third-order relation triple, etc. as the learning progresses may be utilized.

Meanwhile, when the correct answer is 'no correct answer', a combination of two or more entities-relationships that do not have a first-order relation may be selected as a path. For example, 'no correct answer' may be generated by selecting an entity-relation, such as [(50,000 won price range, price range), (Jongno-gu, area)].

The natural language query generating unit 236 generates a natural language query to be uttered in the next dialogue turn based on the first-order relation triple or the multi-order relation triple including a correct answer entity selected by the path selecting unit 234. It should be noted that the natural language query does not include the correct answer entity selected by the path selecting unit 234.

The natural language query generating unit 236 may generate a more natural utterance by inquiring not only the knowledge path selected by the path selecting unit 234 but also the dialogue history recorded by the dialogue recording unit 250.

The natural language query generating unit 236 may be, for example, a machine learning model trained to extract a partial knowledge graph for a dialogue corpus (training data or learning data) and generate a natural language utterance for the extracted partial knowledge graph.

The natural language query generating unit 236 may generate query utterances having various utterance styles, such as a query and answer, a daily dialogue, etc. according to a domain of the dialogue corpus based on the machine learning model. For example, the natural language query generating unit 236 may be a language model that auto-regressively generates the words constituting an uttered sentence based on the dialogue history and the partial knowledge graph.

Meanwhile, the correct answer selecting unit 232, the path selecting unit 234, and the natural language query generating unit 236 of the query generating module 230 may be integrated into one machine learning model.

Table 1 below is an example of learning data or training data for learning correct answer selection, path selection, and natural language query.

TABLE 1

| | Q&A dialog corpus for restaurant search | | |
|---|---|---|---|
| Dialogue turn | User utterance (query) | system utterance (answer) | Partial knowledge graph for dialogue corpus |
| 0 | I'm looking for Korean restaurant that costs about 30,000 won. | There are two places. What area are you looking for? | [30,000 won range, price range, restaurant A] [Korean food, business type, restaurant A] [Korean food, business type, restaurant C] |
| 1 | I'm looking for a restaurant in Gangnam-gu | If so, I recommend Restaurant A located in Gangnam-gu. | [Gangnam-gu, local restaurant A] |

TABLE 1-continued

| Q&A dialog corpus for restaurant search | | | |
|---|---|---|---|
| Dialogue turn | User utterance (query) | system utterance (answer) | Partial knowledge graph for dialogue corpus |
| 2 | Is it possible to dine al fresco there? | Yes, it is possible. | [Restaurant A, available, outdoor dining] |

As illustrated in Table 1, a knowledge graph may be extracted through an algorithm for extracting knowledge triples, such as entity recognition and relationship extraction from a dialogue corpus, or a partial knowledge graph for each dialogue turn may be extracted through a manual labeling operation. The entire knowledge graph may be extracted in the same manner by using the method of extracting the knowledge graph from pre-prepared complex knowledge.

The correct answer selecting unit 232 may be a machine learning model or a deep learning model trained by predicting a next correct answer based on the dialogue history of each dialogue turn or the partial knowledge graph.

The path selecting unit 234 may be a machine learning model or a deep learning model pre-trained in a manner of predicting a knowledge path including a partial knowledge graph and a predicted correct answer entity based on the dialogue history of each dialogue turn.

The natural language query generating unit 236 may be a machine learning model or a deep learning model pre-trained in a manner of generating a corresponding user utterance based on the knowledge path and/or the dialogue history.

The answer generating module 240 extracts a partial knowledge graph by understanding a natural language query generated by the query generating module 230, and then generates a natural language answer to the natural language query. To this end, the answer generating module 240 may include a query understanding unit 242, an answer inferring unit 244, and a natural language answer generating unit 246.

The query understanding unit 242 analyzes a relationship between entities included in a natural language query (or natural language query voice) generated by the query generating module 200, and analyzes a query intention based on the analyzed relationship. For example, for a query 'I'm looking for a Korean restaurant that costs about 30,000 won,' the query understanding unit 242 may extract a query intention, that is, a relationship between entities, such as 'Search-[(price range=about 30,000 won) and (business type=Korean food)]'. Here, the query intention may be a domain corresponding to a type of query, such as search, information provision, and daily dialogue.

In order to analyze the relationship between the entities included in the natural language query and the query intention based thereon, the query understanding unit 242 may be implemented as, for example, an entity name recognition algorithm, a relation extraction algorithm, and an intention analysis algorithm.

The correct answer inferring unit 244 searches a knowledge graph (or partial knowledge graph) based on the query intention analyzed by the query understanding unit 242, and infers a knowledge path describing a correct answer entity corresponding to the query intention and a relationship between the entity included in the natural language query and the correct answer entity. To this end, the correct answer inferring unit 244 may be implemented as a machine learning model or a deep learning model trained to infer the correct answer entity and knowledge path corresponding to the query intention.

The natural language answer generating unit 246 generates an answer utterance based on the knowledge triple including the knowledge path in the partial knowledge graph searched by the correct answer inferring unit 244 and the correct answer entity. For example, the language answer generating unit 246 may generate an utterance of "There are two places. What area are you looking for?" based on the knowledge path of '[30,000 won range, price range, restaurant A/restaurant C], [Korean food, business type, restaurant A/restaurant C]'. Also, the natural language answer generating unit 246 may generate a more natural utterance with reference to the dialogue history recorded by the dialogue recording unit 250.

The natural language answer generating unit 246 may be implemented as a machine learning model and/or a deep learning model trained to extract, for example, an indication graph (or partial knowledge graph) for the dialogue corpus as illustrated in Table 1 and generate natural language utterances for the extracted knowledge graph (partial knowledge graph). Such a machine learning model may generate natural language answer utterances having various utterance styles, such as query and answer, daily dialogue, etc. depending on a domain of the dialogue corpus.

In addition, the natural language answer generating unit 246 may be implemented as a language model auto-regressively generating words constituting an uttered sentence based on the dialogue history and the knowledge graph (partial knowledge graph).

The dialogue recording unit 250 stores and records the correct answer entity selected by the query generating module 200, the knowledge path (the knowledge path for a query), and the natural language query in a storage medium. In addition, the dialogue recording unit 250 stores and records the correct answer entity, the knowledge path (or the knowledge path for an answer), and the natural language answer inferred by the answer generating module 300 in the storage medium.

The dialogue evaluating unit 260 compares the correct answer entity/knowledge path (knowledge path for a query) selected by the query generating module 200, the correct answer entity inferred by the answer generating module 240, and the knowledge path (knowledge path for an answer) and measures an error indicating a difference therebetween.

In order to measure such an error, a loss function that calculates an error by inputting a difference value representing the difference may be utilized. The loss function may be, for example, a mean squared error (MSE), a cross entropy error (SEE), or the like.

Based on the measured error, the dialogue evaluating unit 260 may provide a feedback for selecting an appropriate answer entity and an appropriate knowledge path to the query generating module 230. For example, when accuracy of the knowledge path including the correct answer entity inferred by the answer generating module 240 is high, the query generating module 230 performs learning by reducing a probability that the correct answer entity and the knowledge path used up to the current dialogue turn is utilized again in a next dialogue turn based on the measured error.

Similarly, the dialogue evaluating unit 260 provides, as a feedback, the error of the knowledge path including the correct answer entity inferred by the answer generating module 240 to the answer generating module 240, and the answer generating module 240 performs learning toward minimizing the error.

A dialogue end time point may be a dialogue turn immediately before a time point when the query generating module 230 and the answer generating module 240 have conducted a dialogue up to a maximum number of dialogue turns or when a correct answer (or triple) that may be expanded in the partial knowledge graph selected by the correct answer selecting unit 232 and the path selecting unit 234 of the query generating module 230 cannot be selected.

Figure 6:
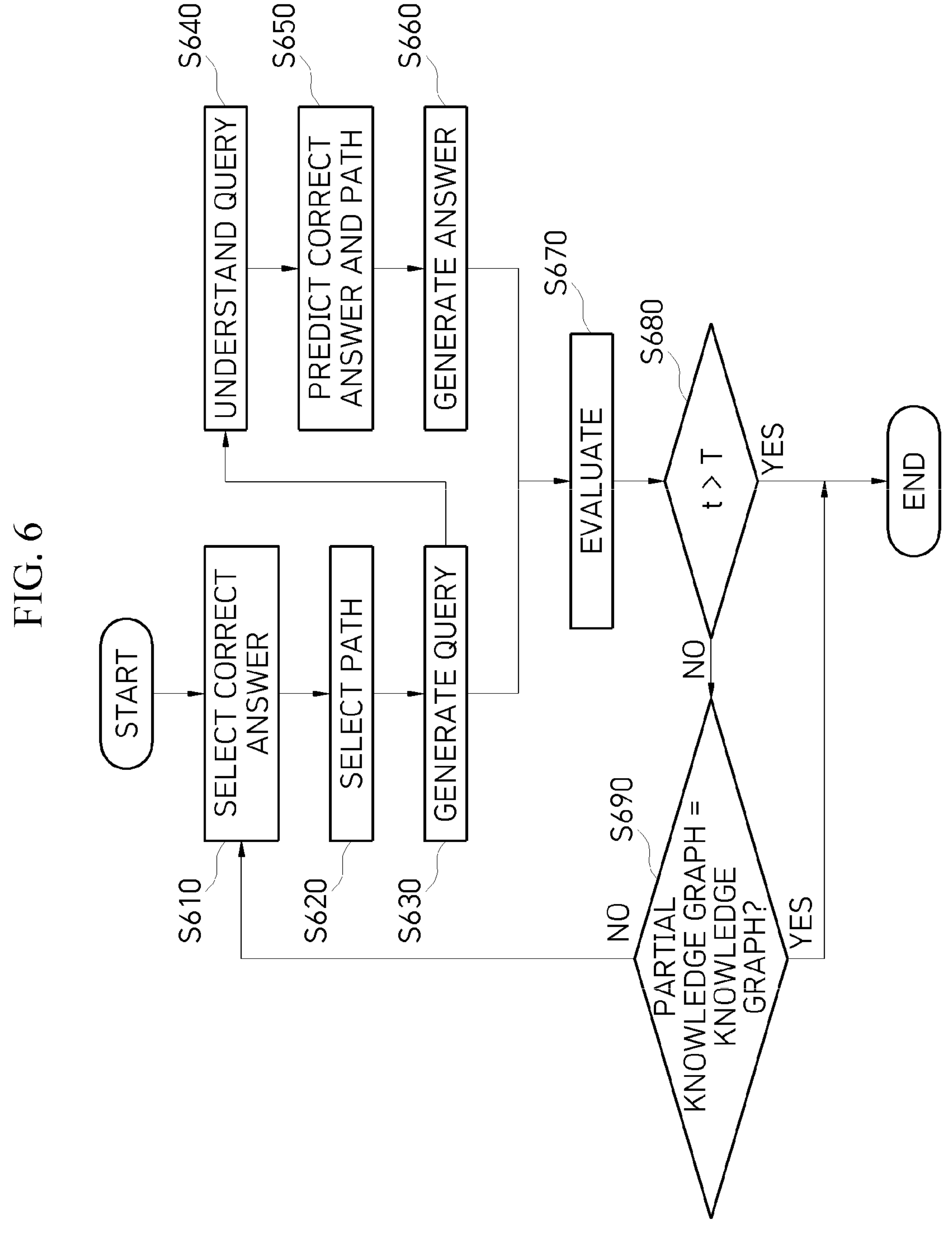
FIG. 6 is a flowchart illustrating a process of performing a self-dialogue by generating a query and generating an answer thereto according to an embodiment of the present invention.

FIG. 6 is a flowchart illustrating a process of performing a self-dialogue by generating a query and generating an answer thereto according to an embodiment of the present invention.

Referring to FIG. 6, first, complex knowledge including unstructured knowledge and structured knowledge is expressed by the knowledge expressing unit 220, as a knowledge graph including a set of triples describing a relationship between entities.

Next, in S610, in the correct answer selecting unit 232 of the query generating module 230 performs a process of selecting a correct answer entity (hereinafter, referred to as a 'first correct answer entity') to be used in a next dialogue turn based on the partial knowledge graph (or the knowledge graph) used up to the current dialogue turn.

In an embodiment of the present invention, the process of selecting the first correct answer entity includes a process of selecting a plurality of candidate correct answer entities connected to a first entity included in the partial knowledge graph and a process of selecting a candidate correct answer entity having the least number of times of use in the current dialogue turn, among the plurality of candidate correct answer entities, as the first correct answer entity. Here, the plurality of candidate correct answer entities are entities not included in the partial knowledge graph.

Next, in S620, the path selecting unit 234 of the query generating module 230 performs a process of selecting a knowledge path for a query describing a relationship between the first entity and the first correct answer entity. In an embodiment of the present invention, the knowledge path for a query may be data describing a first relationship between the first entity used in the current dialogue turn and a first correct answer entity connected to the first entity in the knowledge graph.

Next, in S630, the natural language query generating unit 236 of the query generating module 230 performs a process of generating a natural language query based on the first correct answer entity and/or the knowledge path for a query.

Next, in S640, the query understanding unit 242 of the answer generating module 240 performs a process of extracting entities included in the natural language query generated by the natural language query generating unit 236 based on the entity name recognition algorithm and understanding (analyzing) a query intention by analyzing the relationship between the extracted entities based on a relation extraction algorithm and an intention analysis algorithm, etc.

Next, in S650, the correct answer inferring unit 242 of the answer generating module 240 performs a process of searching for a knowledge graph (or a partial knowledge graph) provided by the knowledge expressing unit 220 based on any one entity (hereinafter, referred to as a 'second entity) and the query intention analyzed by the query understanding unit 242 and inferring a correct answer entity (hereinafter referred to as a second 'correct answer entity') corresponding to the query intention and a knowledge path for an answer. In an embodiment of the present invention, the knowledge path for an answer may be data describing a second relationship between the second entity included in the natural language query and a second correct answer entity corresponding to the query intention.

Next, in S660, the natural language answer generating unit 242 of the answer generating module 240 performs a process of generating a natural language answer based on the second correct answer entity and/or the knowledge path for an answer.

Next, in S670, the dialogue evaluating unit 260 compares and evaluates the knowledge path for a query selected by the query generating module 230 and the knowledge path for an answer inferred by the answer generating module 240 in S670.

According to an embodiment of the present invention, the process of comparing the knowledge path for a query and the knowledge path for an answer may be a process of comparing the first relation described by the knowledge path for a query with the second relation described by the knowledge path for an answer. Here, as described above, the first relationship is a relationship between the first entity used in the current dialogue turn and a first correct answer entity connected to the first entity in the knowledge graph, and the second relationship is a relationship between the second entity included in the natural language query and the second correct answer entity corresponding to the query intention.

Also, the process of evaluating may further include a process of comparing the first correct answer entity with the second correct answer entity.

Meanwhile, although not illustrated in FIG. 6, between S670 and S680, a process in which an evaluation result of the dialogue evaluating unit 260 is provided to each of the query generating module and the answer generating module and a process of learning a dialogue between the query generating module and the answer generating module based on the evaluation result (error) of the dialogue evaluating unit is performed in the query generating module and the answer generating module.

Subsequently, in S680, when the current dialogue turn t exceeds a preset maximum dialogue turn T, the sequential processes of learning a dialogue such that the query generating module 230 generates a natural language query by itself and the answer generating module 240 answers the natural language query are terminated, and if the current dialogue turn (t) is the maximum dialogue turn T or does not reach the maximum dialogue turn T, step S690 is performed.

In step S690, if the expanded partial knowledge graph matches the full knowledge graph in the process of searching for the first and second correct answer entities according to an increase in the number of dialogue turns, that is, if no more correct answer entities (knowledge path or knowledge triple) be selected or inferred, the learning process is terminated, and if the expanded partial knowledge graph does not match the full knowledge graph, i.e., if there remains a correct answer entity (knowledge path or knowledge triple)

that has not been selected yet or that has not been inferred yet in the full knowledge graph, steps S610 to S680 are repeatedly performed.

As described above, the knowledge-based dialogue system for self-learning and the learning method thereof according to an embodiment of the present invention may be utilized not only in information providing services but also in knowledge-based dialogue services, such as education and counseling.

For example, if the answer generating module 240 illustrated in FIG. 1 serves as a system providing information to a user, the query generating module 230 may serve as a teacher asking a query to a user (student). Therefore, in the present invention, an inquiring subject is not fixed to an actual user and an answering subject is not fixed to the system. That is, the query generating module 230 and the answer generating module 240 according to the present invention may serve as a system according to service domains.

In addition, the knowledge-based dialogue system for self-learning and the learning method thereof according to an embodiment of the present invention may be applied to a complex knowledge-based teacher system.

FIG. 7 is a diagram illustrating an example of complex knowledge that may be used when the present invention is applied to a teacher system.

Referring to FIG. 7, in order to check how well a student understands the knowledge, a query such as "What is the symbol of the four trigrams located in the top left corner of the Taegeukgi?" may be asked.

The above query may be generated by the natural language query generating unit 236 after the correct answer selecting unit 232 selects an entity of "sky" and the path selecting unit 234 selects a knowledge path for inducting a correct answer entity of [(Taegeukgi, corner, four trigrams), (four trigrams, top left, gun), (gun, symbol, sky)] in the triples having a third-order relationship.

The query understanding unit 242 of the answer generating module 240 understands the entity and the query intention, such as "information provision—[Taegeukgi, corner, upper left, symbol]" from the query, and the correct answer inferring unit 244 searches a knowledge path in the knowledge graph based thereon and infers a correct answer entity based on the searched knowledge path.

The natural language answer generating unit 246 generates a natural language utterance based on the inferred knowledge path and the correct answer entity.

The correct answer entity, knowledge path, and natural language query utterance generated by the query generating module 230, the correct answer entity inferred by the answer generating module, the knowledge path and inducing the inferred correct answer entity, and natural language answer utterance are recorded by the dialogue recording unit 250 on the storage medium. Then, the dialogue evaluating unit 260 compares the results of the query generating module 230 and the answer generating module 240 based on the information recorded by the dialogue recording unit 250 and provide an error as a feedback to the query generating module 230 and the answer generating module 240. The query generating module 230 and the answer generating module 240 perform self-learning based on the feedback error toward reducing the error.

Figure 8:
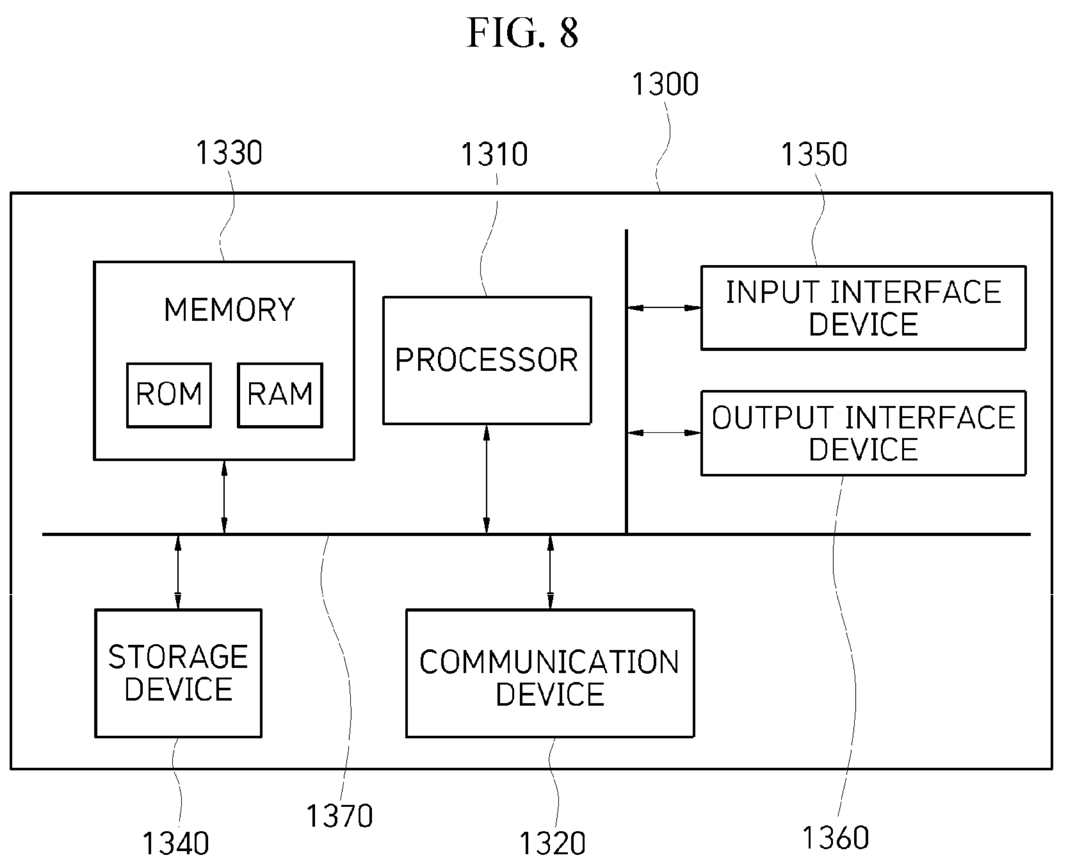
FIG. 8 is a block diagram illustrating a computer system for implementing a method according to an embodiment of the present invention.

FIG. 8 is a block diagram illustrating a computer system for implementing a method according to an embodiment of the present invention.

Referring to FIG. 8, the computer system 1300 may include at least one of a processor 1310, a memory 1330, an input interface device 1350, an output interface device 1360, and a storage device 1340 that communicate via a bus 1370.

The computer system 1300 may also include a communication device 1320 coupled to a network. The processor 1310 may be a central processing unit (CPU) or GPU processing the self-learning method of the knowledge-based dialogue system of the present invention or a semiconductor device executing instructions stored in the memory 1330 or the storage device 1340. The memory 1330 and the storage device 1340 may include various types of volatile or non-volatile storage mediums. For example, the memory may include read only memory (ROM) and random access memory (RAM).

In an embodiment of the present disclosure, the memory may be located inside or outside the processor, and the memory may be connected to the processor through various known means. The memory may be various types of volatile or non-volatile storage mediums, and for example, the memory may include a read-only memory (ROM) or a random access memory (RAM).

Accordingly, an embodiment of the present invention may be implemented as a method implemented in a computer or may be implemented as a non-transitory computer-readable medium having computer-executable instructions stored therein. In an embodiment, when executed by a processor, computer-readable instructions may perform a method according to at least one aspect of the present disclosure.

The communication device 1320 may transmit or receive a wired signal or a wireless signal.

In addition, the embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

The computer-readable recording medium may include a hardware device configured to store and perform a program command. Examples of computer-readable medium include magnetic medium, such as hard disks, floppy disks, and magnetic tape; optical medium, such as CD ROM disks and DVDs; magneto-optical medium, such as floptical disks; and hardware devices that are specially configured to store and perform program instructions, such as read-only memory (ROM), random access memory (RAM), flash memory, and the like. Examples of program instructions include both machine code, such as produced by a compiler, and higher level code that may be executed by the computer using an interpreter or the like.

The exemplary embodiments of the present invention have been described in detail, but the scope of the present invention is not limited thereto and various variants and modifications by a person skilled in the art using a basic concept of the present invention defined in claims also belong to the scope of the present invention.

It will be apparent to those skilled in the art that various modifications and variations may be made in the present invention without departing from the spirit or scope of the inventions. Thus, it is intended that the present invention covers the modifications and variations of this invention provided they come within the scope of the appended claims and their equivalents.

What is claimed is:

1. A self-learning method of a knowledge-based dialogue system, as a learning method of a dialogue system including a query generating module, an answer generating module, and a dialogue evaluating unit executed by a processor, the self-learning method comprising:

generating, by the query generating module, a natural language query by itself based on a knowledge path for a query selected from a knowledge graph;

inferring, by the answer generating module, a knowledge path for an answer corresponding to a query intention of the natural language query from the knowledge graph, and generating a natural language answer by itself based on the knowledge path for an answer;

comparing and evaluating, by the dialogue evaluating unit, the knowledge path for a query and the knowledge path for an answer; and learning, by the query generating module and the answer generating module, a dialogue between the query generating module and the answer generating module based on an evaluation result of the dialogue evaluating unit;

wherein the generating of the natural language query by itself includes:

selecting a knowledge path for a query connecting an entity used in a current dialogue turn and a correct answer entity to be used in a next dialogue turn in the knowledge graph; and generating the natural language query corresponding to the knowledge path for a query by using a machine learning model trained to generate the natural language query based on a knowledge graph for learning extracted from a dialogue corpus; and wherein the generating of the natural language answer by itself includes:

analyzing the query intention by analyzing a relationship between entities included in the natural language query;

inferring the knowledge path for an answer describing a relationship between at least one entity among the entities in the knowledge graph and a correct answer entity corresponding to the query intention; and generating a natural language answer based on the correct answer entity and the knowledge path for an answer.

2. The self-learning method of claim 1, further comprising:

expressing, by a knowledge expressing unit executed by the processor, complex knowledge including unstructured knowledge and structured knowledge as the knowledge graph including a set of triples describing a relationship between entities.

3. The self-learning method of claim 1, wherein the generating of the natural language query by itself includes:

selecting a correct answer entity to be used in a next dialogue turn based on a partial knowledge graph used in a current dialogue turn, the partial knowledge graph representing a part of the knowledge graph;

selecting the knowledge path for a query describing a relationship between an entity included in the partial knowledge graph and the correct answer entity; and generating the natural language query based on the knowledge path for a query.

4. The self-learning method of claim 3, wherein the selecting of the correct answer entity includes:

selecting a plurality of candidate correct answer entities connected to the entity included in the partial knowledge graph within the knowledge graph; and selecting, as the correct answer entity, a candidate correct answer entity having a lowest number of use in the current dialogue turn from among the plurality of candidate correct answer entities.

5. The self-learning method of claim 1, wherein the knowledge path for a query describes a first relationship between a first entity used in the current dialogue turn and a first correct answer entity connected to the first entity in the knowledge graph, and the knowledge path for an answer describes a second relationship between a second entity included in the natural language query and a second correct answer entity corresponding to the query intention of the natural language.

6. The self-learning method of claim 5, wherein the evaluating includes:

comparing the first correct answer entity with the second correct answer entity; and comparing the first relationship with the second relationship.

7. A knowledge-based dialogue system for self-learning conversations, the knowledge-based dialogue system comprising:

a communication interface configured to receive complex knowledge including unstructured knowledge and structured knowledge;

a knowledge conversion unit configured to convert the complex knowledge into a knowledge graph including a set of knowledge triples describing relationships between entities;

a query generating module configured to generate a natural language query by itself based on a knowledge path for a query selected from the knowledge graph;

an answer generating module configured to infer a knowledge path for an answer corresponding to a query intention of the natural language query from the knowledge graph, and generating a natural language answer by itself based on the knowledge path for an answer;

a dialogue evaluating unit configured to compare the knowledge path for a query and the knowledge path for an answer to evaluate a difference between the knowledge path for a query and the knowledge path for an answer; and a processor configured to control operations of the knowledge conversion unit, the query generating module, the answer generating module, and the dialogue evaluating unit;

wherein generating the natural language query includes using a machine learning model trained to generate the natural language query based on the knowledge graph for learning extracted from a dialogue corpus;

wherein the generating of the natural language answer by itself includes:

analyzing the query intention by analyzing a relationship between entities included in the natural language query; and wherein inferring the knowledge path for an answer includes describing a relationship between at least one entity among the entities in the knowledge graph and a correct answer entity corresponding to the query intention; and generating a natural language answer based on the correct answer entity and the knowledge path for an answer.

8. The knowledge-based dialogue system of claim 7, wherein the query generating module includes:

a correct answer selecting unit configured to select a correct answer entity to be used in a next dialogue turn based on a partial knowledge graph used in a current dialogue turn, the partial knowledge graph representing a part of the knowledge graph;

a path selecting unit configured to select the knowledge path for a query describing a relationship between an entity included in the partial knowledge graph and the correct answer entity; and a natural language query generating unit configured to generate the natural language query based on the knowledge path for a query.

9. The knowledge-based dialogue system of claim 8, wherein the correct answer selecting unit selects a plurality of candidate correct answer entities connected to the entity included in the partial knowledge graph in the knowledge graph and then selects a candidate correct answer entity having a least number of use in the current dialogue turn, among the plurality of candidate correct answer entities, as the correct answer entity.

10. The knowledge-based dialogue system of claim 7, wherein the answer generating module includes:

a query understanding unit configured to analyze a relationship between the entities included in the natural language query and analyze the query intention;

a correct answer interfering unit configured to infer the knowledge path for an answer describing a relationship between at least one of the entities in the knowledge graph and the correct answer entity corresponding to the query intention; and a natural language answer generating unit configured to generate a natural language answer based on the correct answer entity and the knowledge path for an answer.

11. The knowledge-based dialogue system of claim 7, wherein the dialogue evaluating unit compares the knowledge path for a query describing a first relationship between the entity used in the current dialogue turn and a first correct answer entity selected based on the entity used in the current dialogue turn with the knowledge path for an answer describing a second relationship between the entity included in the natural language query and a second correct answer entity inferred based on the entity included in the natural language query.

12. The knowledge-based dialogue system of claim 11, wherein the dialogue evaluating unit compares the first correct answer entity with the second correct answer entity and compares the first relationship with the second relationship.

13. A self-learning method of a knowledge-based dialogue system, as a learning method of a dialogue system including a query generating module, an answer generating module, and a dialogue evaluating unit executed by a processor, the self-learning method comprising:

selecting, by the query generating module, a knowledge path for a query describing a first relationship between a first entity used in a current dialogue turn and a first correct answer entity to be used in a next dialogue turn in a knowledge graph and generating a natural language query based on the knowledge path for a query;

selecting, by the answer generating module, a knowledge path for an answer describing a second relationship between a second entity included in the natural language query and a second correct answer entity corresponding to a query intention of the natural language query in the knowledge graph and generating a natural language answer by itself based on the knowledge path for an answer;

evaluating, by the dialogue evaluating unit, an error between the knowledge path for a query and the knowledge path for an answer; and learning, by the query generating module and the answer generating module, the knowledge path for a query and the knowledge path for an answer based on the error, wherein generating the natural language query includes using a machine learning model trained to generate the natural language query based on the knowledge graph for learning extracted from a dialogue corpus; and wherein the generating of the natural language answer by itself includes:

analyzing the query intention by analyzing a relationship between entities included in the natural language query, inferring the knowledge path for an answer describing a relationship between at least one entity among the entities in the knowledge graph and a correct answer entity corresponding to the query intention; and generating a natural language answer based on the correct answer entity and the knowledge path for an answer.

14. The self-learning method of claim 13, wherein the knowledge graph expresses a complex knowledge including unstructured knowledge and structured knowledge as a set of triples describing a relationship between entities.

15. The self-learning method of claim 13, wherein the knowledge path for a query is triple data structured in the order of the first entity, the first relationship, and the first correct answer entity, and the knowledge path for an answer is triple data structured in the order of the second entity, the second relationship, and the second correct answer entity.

16. The self-learning method of claim 15, wherein measuring of an error includes:

measuring an error between the first relationship and the second relationship; and measuring an error between the first correct answer entity and the second correct answer entity.

* * * * *